United States Patent [19]

Haefner et al.

[11] Patent Number: 5,060,965
[45] Date of Patent: Oct. 29, 1991

[54] TRAILER COUPLING WITH FORCE SENSING MEANS

[75] Inventors: Hans W. Haefner, Aichach-Walchshofen; Manfred Heimbach, Augsburg, both of Fed. Rep. of Germany

[73] Assignee: Pfister GmbH, Augsburg, Fed. Rep. of Germany

[21] Appl. No.: 602,582

[22] Filed: Oct. 24, 1990

[30] Foreign Application Priority Data

Oct. 25, 1989 [DE] Fed. Rep. of Germany ....... 3935479

[51] Int. Cl.$^5$ .......................... B60D 1/14; G01L 5/13
[52] U.S. Cl. ..................................... 280/504; 280/483; 280/439; 73/862.57
[58] Field of Search ........... 73/862.57, 862.58, 862.68, 73/862.38, 862.62; 280/422, 432, 433, 446.1, 488, 493, 504, DIG. 14; 188/112 A, 112 R

[56] References Cited

U.S. PATENT DOCUMENTS

| 1,994,388 | 7/1931 | Ericksen | 73/862.62 |
| 3,410,135 | 11/1965 | Reynaud | 73/862.38 |
| 3,827,709 | 8/1974 | Madura et al. | 280/439 |
| 4,279,162 | 7/1981 | Neill et al. | 73/746 |
| 4,319,766 | 3/1982 | Corteg et al. | 280/446.1 X |
| 4,715,611 | 12/1987 | Breu | 280/504 |
| 4,864,874 | 9/1989 | Häfner | 73/862.57 X |

FOREIGN PATENT DOCUMENTS

| 3530817 | 3/1987 | Fed. Rep. of Germany | 280/446.1 |
| 3726823 | 12/1988 | Fed. Rep. of Germany | 280/504 |
| 583110 | 12/1976 | Switzerland . | |

Primary Examiner—Kenneth R. Rice
Assistant Examiner—Kevin Hurley
Attorney, Agent, or Firm—Armstrong, Nikaido, Marmelstein, Kubovcik & Murray

[57] ABSTRACT

A trailer coupling including an intermediate unit to be inserted between a standard-type connecting coupling and a trailing vehicle and having integrated therein a force measuring cell for determining vertical forces. Furthermore, horizontal pushing and pulling forces may be determined by integrating at least one force measuring cell acting in horizontal direction. The fifth wheel coupling of semi-trailers may have integrated force measuring cells measuring forces acting in vertical, longitudinal, horizontal and/or lateral horizontal directions.

21 Claims, 4 Drawing Sheets

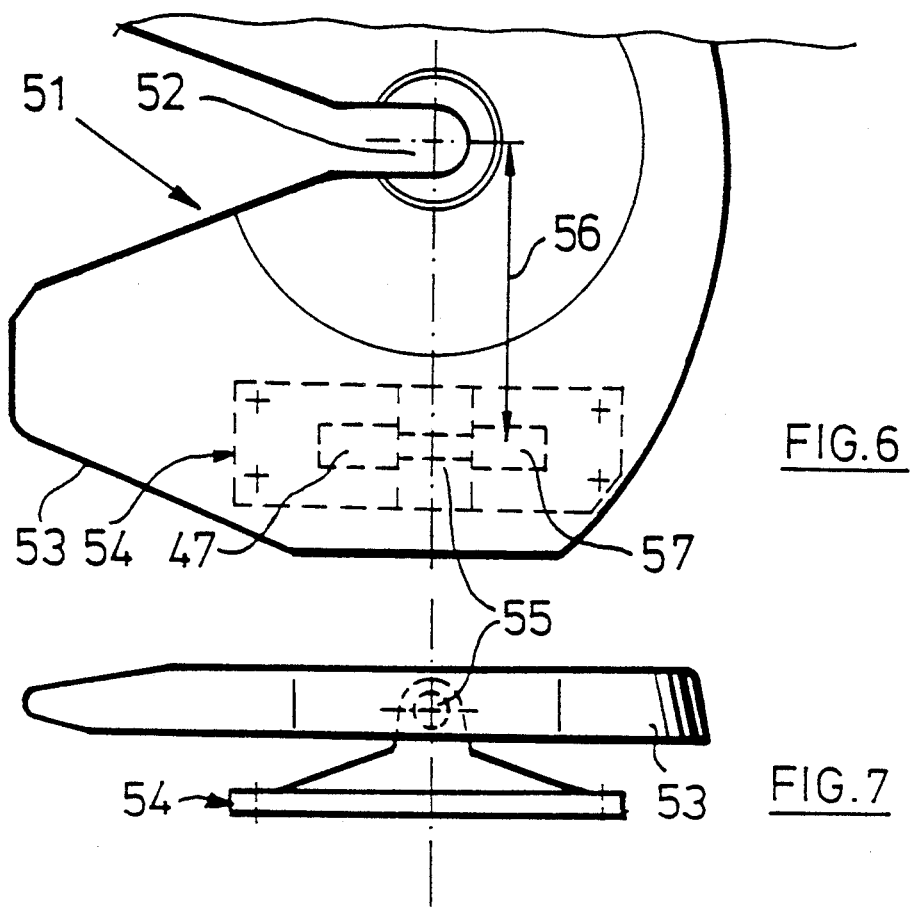
FIG.6
FIG.7
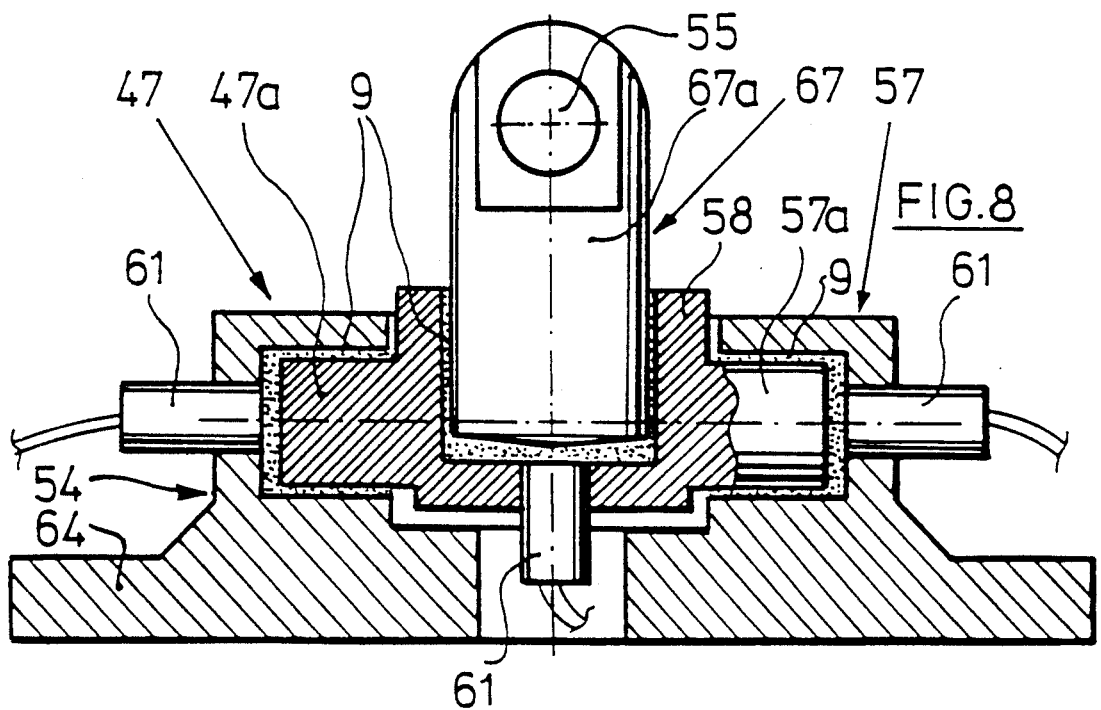
FIG.8

TRAILER COUPLING WITH FORCE SENSING MEANS

FIELD OF THE INVENTION

The invention relates to a trailer coupling or similar device including means for measuring forces introduced in the coupling under driving conditions.

BACKGROUND OF THE ART

European Patent Application Publication No. 302 437 (U.S. Ser. No. 380,414, now abandoned discloses a trailer coupling having force measuring cells integrated therein. With one embodiment a force measuring cell is used for determining the load of a trailer. A further embodiment uses one or a twin arrangement of force measuring cells for determining push and pull forces. The force measuring cells are of a type as disclosed in U. S. Pat. No. 4,739,666 which, in principle, consists of a pot-like housing with a piston inserted in the recess thereof forming a narrow gap between the opposing peripheral surfaces and bottom surfaces. The narrow gap is completely filled with elastomeric material which is in contact with a pressure sensor.

SUMMARY OF THE INVENTION

It is an object of the present invention to provide a trailer coupling having integrated therein at least one force measuring device.

It is a further object of the present invention to provide a trailer coupling provided with an intermediate unit comprising at least one force measuring device and insertable as a kit between connecting means and a tracting vehicle.

It is a still further object of the present invention to provide a trailer coupling for a semitrailer having integrated at least one force measuring device.

According to the invention there is provided a trailer coupling for connecting a trailing vehicle to a tracting vehicle comprising standard-type connecting means having a rear portion formed as a flange; an intermediate unit formed of first and second parts each of said parts having formed thereon a flange for connection to said flange of said connecting means and to said tracting vehicle, respectively; wherein said first part is formed as a force measuring cell including a housing having formed therein a cylindrical recess having a vertical axis, a piston having an upward projecting cylindrical portion and being inserted into said recess forming a narrow cylindrical gap between a peripheral surface of said piston and an interior peripheral surface of said housing, elastomeric material essentially filling said narrow gap and a space formed between a bottom surface of said housing and an interior end surface of said piston, a pressure sensor being mounted in said housing arranged in contact with said elastomeric material; and wherein said second part has formed thereon at a position opposite to said flange a horizontally projecting eyelet member with said upward projecting cylindrical portion of said piston inserted therein, fixing means holding said eyelet member on said upward projecting portion, such that said standard-type connecting means is pivotable about said vertical axis, with vertical forces exerted by said trailing vehicle onto said standard-type connecting means via said eyelet member onto said piston being measured by said force measuring cell whilst any horizontal forces being deviated through said elastomeric material to said housing without effecting the measurement of said vertical forces.

According to another aspect of the invention there is provided a trailer coupling for connecting a trailing vehicle to a tracting vehicle comprising standard-type connecting means for connecting said trailing vehicle to said tracting vehicle and having a rear end thereof formed as a piston portion; an essentially cylindrical housing fixed at said tracting vehicle for receiving said piston portion in a manner rotatable about a longitudinal axis thereof, and shiftable in a direction of said longitudinal axis to an extent limited by elastic means arranged between interior surfaces of said housing and exterior surfaces of said piston; an annular-type force measuring means comprising a piston-type ring mounted on said piston portion said piston-type ring having a lower first ring surface at its one end, a second higher ring surface at its other end, and an essentially radial surface connecting said two ring surfaces, and an annular member surrounding said piston-type ring and having an interior peripheral contour complementary to that of said piston-type ring for forming narrow cylindrical gaps with said lower ring surface and said upper ring surface and a space with said essentially radial surface, said gaps and said space being filled with elastomeric material fixedly adhering to surfaces contacted thereby, a pressure sensor being mounted in said annular member in contact with said elastomeric material, said annular member being fixed to an interior peripheral surface of said housing such that forces acting in a direction of said longitudinal axis of said piston portion are determined by said force measuring cell.

According to a further aspect of the invention there is provided a trailer coupling for connecting a trailing vehicle to a tracting vehicle comprising standard-type connecting means for connecting said trailing vehicle to said tracting vehicle and having a rear end thereof formed as a piston portion; an essentially cylindrical housing fixed at said tracting vehicle for receiving said piston portion in a manner rotatable about a longitudinal axis thereof, and shiftable in a direction of said longitudinal axis to an extent limited by elastic means arranged between interior surfaces of said housing and exterior surfaces of said piston; a force measuring means comprised by said end wall of said housing having formed thereon an inward piston-type projection coaxial with said piston portion of said connecting means said projection being inserted in a pot-type member forming a narrow cylindrical gap between an interior peripheral surface of said member and an exterior peripheral surface of said projection and a space between a bottom surface of said member and an inner end surface of said projection said gap and said space being filled with elastomeric material, a pressure sensor being mounted in said end wall arranged in contact with said elastomeric material, said elastic means further being arranged between end surfaces of said pot-type member and said piston-type projection.

According to a still further aspect of the invention there is provided a trailer coupling for a fifth wheel connection comprising a saddle plate provided with a draw eyelet and pivotally supported by means of a lateral shaft on two lateral support elements; at least one of said support elements having integrated therein force measuring means for measuring forces in at least one of vertical, horizontally longitudinal and horizontally lateral directions.

BRIEF DESCRIPTION OF THE DRAWINGS

FIG. 6 is a plan view of a further embodiment of the trailer coupling designed as a saddle coupling;

FIG. 7 is an elevational view of the trailer coupling of FIG. 6; and

FIG. 8 is a sectional view through a detail of the trailer coupling of FIG. 7.

FIG. 1 illustrates a trailer coupling 1 according to the German national standard DIN 11 025 including a draw eyelet 2 fixed at a tractor vehicle 3a (not shown in detail) by means of a flange member 3 by screws (not shown). For improved flexibility as, for example, may be required in the agricultural field, the eyelet 2 is axially rotatable in a support ring 4.

Figure 1:
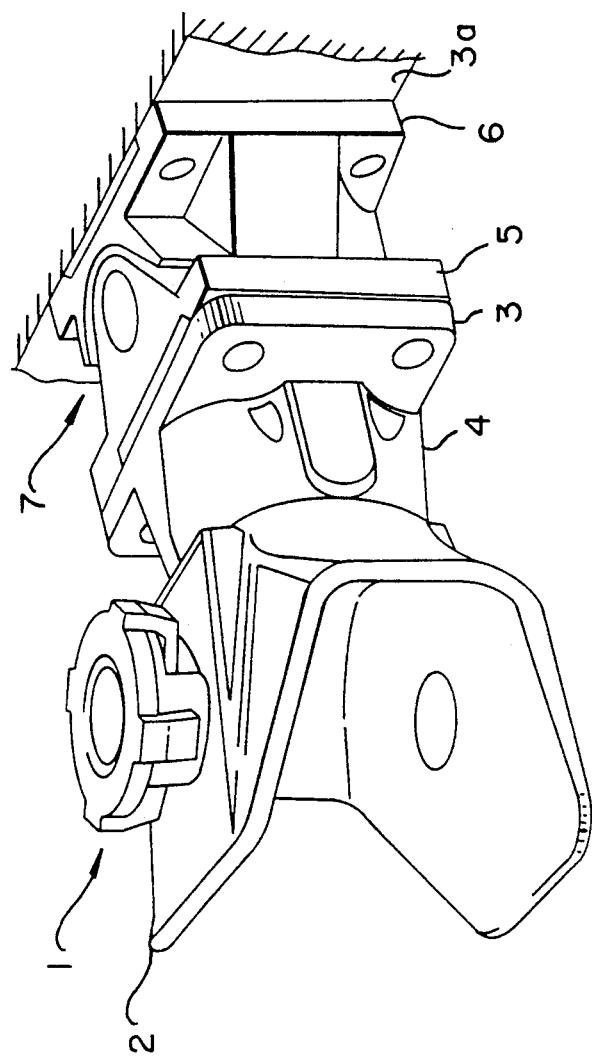
FIG. 1 illustrates a trailer coupling having a force measuring cell incorporated.

According to the invention a force measuring cell 7 is inserted between the flange member 3 and the tractor vehicle 3a which force measuring cell 7 determines the forces acting onto the trailer coupling 1 in vertical direction. For this purpose, the flange member 3 of the trailer coupling 1 is connected to a coupling flange 5 of the force measuring cell 7 connected in turn with a connecting flange 6 of the tractor vehicle 3a. In addition to the illustrated force measuring cell 7, for measuring vertical loading forces, a second and even a third force measuring cell may be provided as explained in more detail below.

Figure 3:
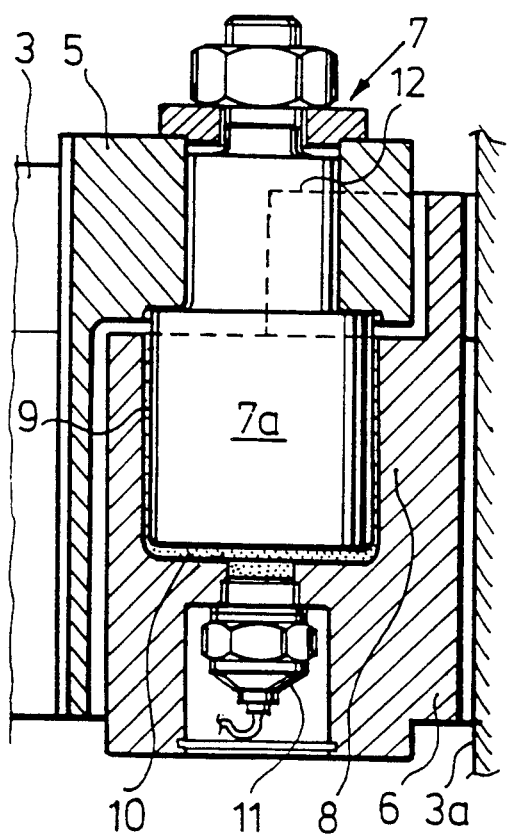
FIG. 3 is a longitudinal section through the trailer coupling of FIG. 1.
Figure 2:
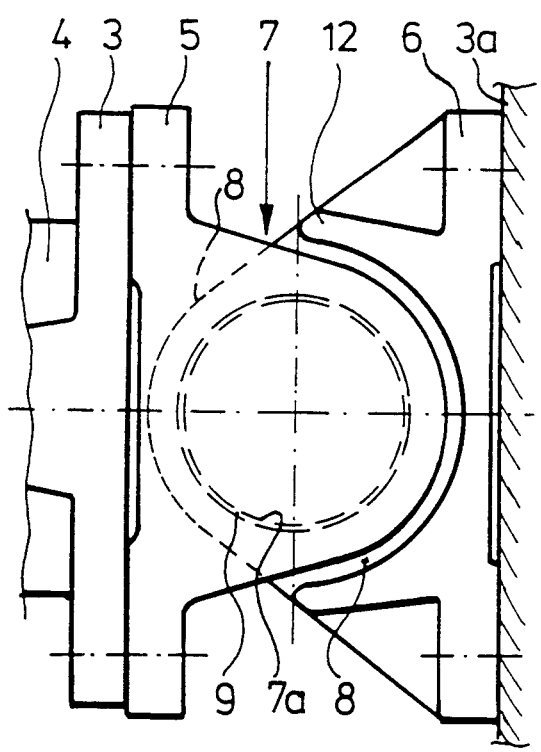
FIG. 2 is a plan view onto the trailer coupling of FIG. 1.

FIG. 2 is a plan view of the trailer coupling 1 including the force measuring cell 7, whilst FIG. 3 is a sectional view of the coupling according to FIG. 2. The flange member 3 of the trailer coupling 1 is supported by the connecting flange 6 via the coupling flange 5 and a piston 7a. The connecting flange 6 is formed as a housing 8 for receiving the piston 7a. Between the piston 7a and the pot-like housing 8 there is a space at the bottom of the housing 8 and a narrow annular gap 9 completely filled with elastomeric material 10 (indicated by dots). Preferably, the gap 9 has a height larger than half of the diameter of the piston 7a. A pressure sensor 11 fixed below the bottom of the housing 8 is in contact with the elastomeric material 10, for example, a silicon fixedly adhering to the contacting metal surfaces, such that with a load force acting in vertical direction onto the piston 7a, the latter is acting on the pressure sensor 11 through the elastomeric material 10. As illustrated in European Patent Application 0 302 437, the measuring signal of the pressure sensor 11 may be transmitted to control devices as antiblocking systems for the vehicle combination. By filling the narrow annular gap 9 by elastomeric material 10, the trailer coupling 1 resists even high pulling forces with a fully loaded trailer and simultaneously enables a sensitive response of the sensor 11 for vertical forces. In order to prevent a twisting of the piston 7a around the axis thereof a limiting stop 12 is provided avoiding the shearing-off of the elastomeric material 10 in the annular gap 9 due to a twisting of the piston 7a in the pot-like housing 8.

Figure 4:
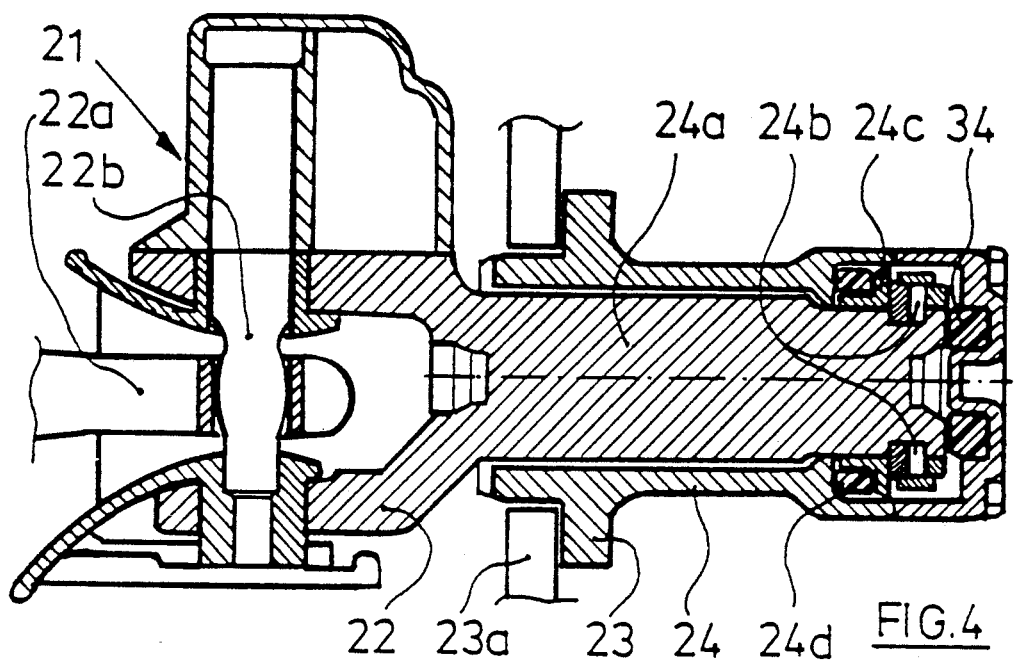
FIG. 4 shows a known trailer coupling.

FIG. 4 shows a second embodiment of a trailer coupling 21 according to the German standard DIN 74 053. A drawbar 22a of a trailer (not shown) is introduced into the draw eyelet 22 and fixed there by an insert bolt 22b. The draw eyelet 22 continues into a bolt 24a axially rotatably supported in a support ring 24. The support ring 24 supports with its supporting member 23 rearward against a frame portion of the tractor vehicle 23a. The bolt 24a is provided at its front end with an axial bearing 24b in order to permit larger turning movements of the bolt 24a. The pulling force is then transmitted through a transmitting ring 24c to a dampening ring 24d supported through the supporting ring 24. In opposite direction there is provided a further dampening ring 34 in order to attenuate changing burst-type pull and push loadings of the trailer coupling 21. The trailer coupling illustrated in FIG. 4 is commonly known and used with a plurality of trucks. A trailer coupling supplemented according to the invention is shown in FIG. 5.

With this embodiment bolt 24a again is supported through the axial bearing 24b, the transmission ring 24c, and the dampening ring 24d in pulling direction. However, with this design the dampening ring 24d acts onto an inserted force measuring cell 27, i.e. directly onto the piston 27a thereof which is guided by means of the elastomeric material 30 (indicated by dots) provided in the narrow annular gap 29 and acts in turn onto the pressure sensor 31. With the present design the pressure sensor 31 is threaded in advantageous manner into a shoulder of the housing 28 such that the pressure sensor 31 may be easily exchanged. The housing 28 is fixed by means of a fixing stud 32 having a similar function as the limiting stop 12 in FIG. 2. By means of the force measuring cell 27 incorporated into the force path between the tractor vehicle 23a and the trailer coupling 21 the pulling forces acting onto the trailer coupling 21 are determined whilst pushing forces in the trailer coupling 21 are entered into a second force measuring cell 37 through a dampening ring 34, a housing 38, which force measuring cell 37 is illustrated in the right portion of the FIG. 5.

With a reversal of the situation for the force measuring cell 27 explained above, the pushing forces are introduced to the second force measuring cell 37 through the housing 39 whilst the piston 37a having a smaller diameter houses the pressure sensor 31. This arrangement of the pressure sensor 31 in the bottom of the piston 37a is of independent inventive importance as the interior of the piston 37a may be used in a space-saving manner for housing the pressure sensor 31. Such a specifically designed force measuring cell has a particularly low height or width, respectively, and is particularly adapted for compact trailer couplings and any other type of devices having narrow housing space for the force measuring cell. By the opposite arrangement of two force measuring cells 27 and 37 all forces acting in the trailer coupling 21 in pull and push direction may be determined.

Figure 5:
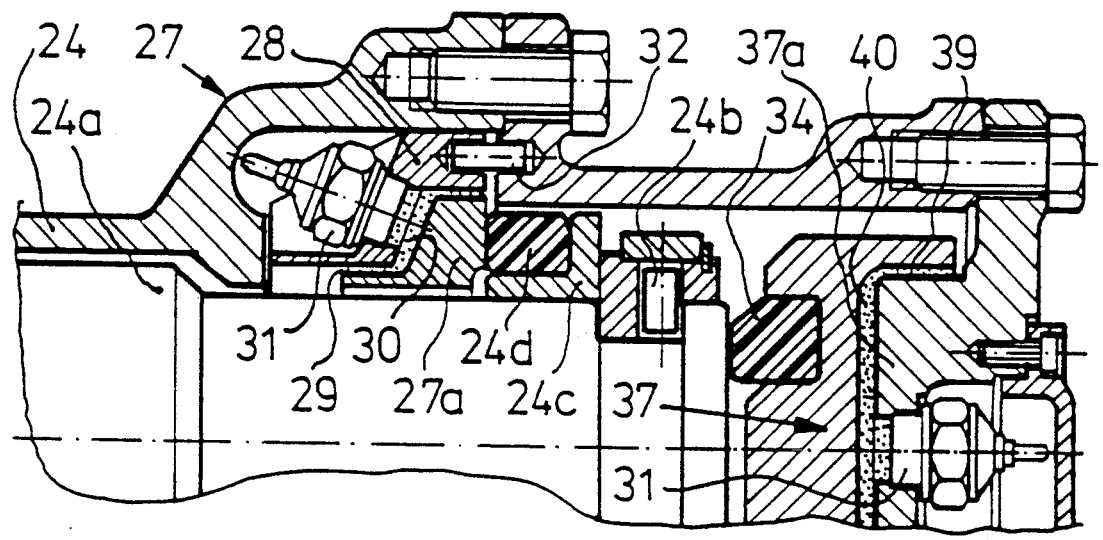
FIG. 5 shows the trailer coupling of FIG. 4 modified according to the invention by incorporating force measuring cells.
Figure 5A:
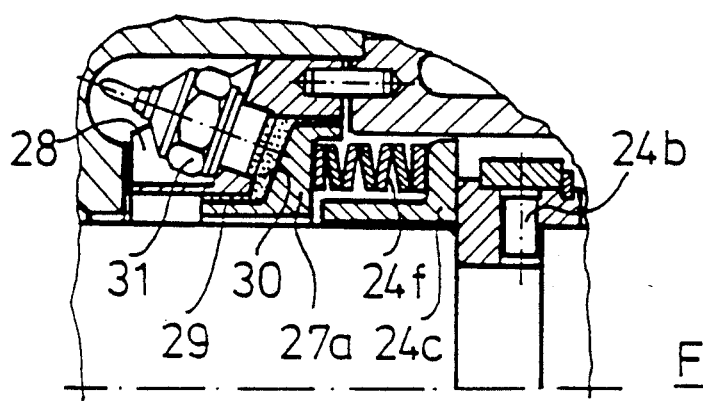
FIG. 5a shows a modified detail of FIG. 5.

FIG. 5a illustrates a modified embodiment with a similar design as that of FIG. 5 with the exception that the dampening ring 24d is replaced by a dish-spring package 24f. The latter loads the piston 27a and the force measuring cell 27 is biased without any exterior loading. Pushing forces acting onto the bolt 24a result in an increase of the pressure at the pressure sensor 31 whilst with a push or press loading in opposite direction determined by the second force measuring cell 37 (FIG. 5) the biasing is reduced. For this purpose the spring biasing is selecting at least with the maximum pushing force. This means that with a single force measuring cell 27 both pulling and pushing forces may be determined such that in view of the spring biasing according to FIG. 5a the second force measuring cell 37 of FIG. 5 may be omitted.

FIGS. 6 and 7 illustrate a fifth wheel or semitrailer coupling 51 basically known. With this design the draw eyelet 52 is provided in the center of a saddle plate 53 pivotally supported by a lateral shaft 55 on two lateral support elements 54.

FIG. 8 shows the modifications according to the invention of such a fifth wheel coupling. First, at least one of the support elements 54 including a bearing for the lateral shaft 55 is designed exchangeably. The lateral shaft 55 is passed through a first piston 67a fitted into a recess of a unitary member 58 in vertical direction and acting onto a sensor 61 arranged thereunder. Thus, a first vertically aligned force measuring cell 67 is formed. Furthermore, horizontally aligned force measuring cells 47 and 57 having similar sensors 61 each are provided for determining horizontal pulling and pushing forces in longitudinal direction. Preferably, these force measuring cells have a similar design as force measuring cell 7 of FIG. 3 including the narrow gap 9. In this connection it is of advantage to have the member 58 incorporating the first vertical force measuring cell 67 simultaneously form in twin-type the pistons 47a and 57a of the second and third horizontal force measuring cells 47 and 57. Thus, by means of this unitary member 58 housed in a base 64 of the support member 54, all forces necessary for controlling antiblocking systems are determined. If desired, the force measuring cells 47 and 57 may be arranged according to the principle design according to FIG. 5. Instead of providing two horizontal force measuring cells 47 and 57, only one may be provided, as with the embodiment according to FIG. 5a, and biased by a spring with a force corresponding to the maximum force expected.

In a still further modification lateral forces acting in a direction of the longitudinal axis of the lateral shaft 55 may be determined by providing one or two force measuring cells (not shown) similarly to the force measuring cells 47 and 57 in lateral direction, as incorporated or combined with lateral shaft 55 or integrated in said unitary member 58, then having a cross-type form with a correspondingly complementary shape of the base portion 64 of support element 54.

As with the force measuring cells of the embodiments of the preceding Figures such a device may be easily supplemented to a semitrailer in use by exchanging the usual support element 54 by one shown in FIG. 8. For determining the horizontal pulling, pushing, lateral and/or vertical forces, the exchange of one support element 54 of the saddle plate 53 may be sufficient; however, both support members 54 may be exchanged by support members having force measuring cells, as 67, 47, and/or 57 incorporated. In this connection it is of importance that a considerable number of elements of common trailer couplings may stay in further use. Thus, even older tractor vehicles may be furnished with force measuring cells.

The triple force measuring cell 67, 47, 57, according to FIG. 8 may even be used for a trailer coupling 1 according to FIG. 1 when the fixing elements for the support member 54 are replaced by corresponding connecting elements, i.e. the coupling flange 5, and the connecting flange 6.

Though it is of advantage to incorporate all three force measuring cells 67, 47, and 57, in one support member 54 only, alternatively the horizontal forces may be measured by the force measuring cells 47 and 57 arranged in the one support member 54 whilst vertical forces may be measured by the force measuring cell 67 arranged in the other support member 54.

In addition, by the arrangement of the force measuring cells laterally of the central draw eyelet in addition to a force measurement it is possible to measure moments when considering lever length 56 (FIG. 6) which permits during curve driving and large steering angles between the tractor vehicle 3a and the trailer or semitrailer to determine the moments acting on the trailer coupling 1 about the vertical axis, which moments may be used for optimizing driving condition. For example, such measurement values may be used in connection with an antiblocking system to brake the right and left wheels of the vehicle combination differently.

Appropriate threshold values may be stored in a memory of a microprocessor control as well as programs to be initiated in response of the measured values as explained exemplary in EP-A-0 302 437 in more detail.

The invention is not only applicable for road vehicles but also for trains on railroads.

We claim:

1. A trailer coupling for connecting a trailing vehicle to a tracting vehicle comprising:

standard-type connecting means having a rear portion formed as a flange;

an intermediate unit formed of first and second parts each of said parts having formed thereon a flange for connection to said flange of said connecting means and to said tracting vehicle, respectively;

wherein said first part is formed as a force measuring cell including a housing having formed therein a cylindrical recess having a vertical axis, a piston having an upward projecting cylindrical portion and being inserted into said recess forming a narrow cylindrical gap between a peripheral surface of said piston and an interior peripheral surface of said housing, elastomeric material essentially filling said narrow gap and a space formed between a bottom surface of said housing and an interior end surface of said piston, a pressure sensor being mounted in said housing arranged in contact with said elastomeric material; and wherein said second part has formed thereon at a position opposite to said flange a horizontally projecting eyelet member with said upward projecting cylindrical portion of said piston inserted therein, fixing means holding said eyelet member on said upward projecting portion, such that said standard-type connecting means is pivotable about said vertical axis, with vertical forces exerted by said trailing vehicle onto said standard-type connecting means via said eyelet member onto said piston being measured by said force measuring cell whilst any horizontal forces being deviated through said elastomeric material to said housing without effecting the measurement of said vertical forces.

2. The trailer coupling of claim 1, wherein a depth of said cylindrical recess of said housing is larger than half of the diameter thereof.

3. The trailer coupling of claim 1, wherein lateral stop means are provided in horizontal juxtaposition to said eyelet member for limiting a pivotal movement of said standard-type connecting means about said vertical axis.

4. The trailer coupling of claim 1, wherein said intermediate unit is formed as a kit to be inserted between said standard-type connecting means and said tracting vehicle already in use.

5. A trailer coupling for connecting a trailing vehicle to a tracting vehicle comprising:
standard-type connecting means for connecting said trailing vehicle to said tracting vehicle and having a rear end thereof formed as a piston portion;
an essentially cylindrical housing fixed at said tracting vehicle for receiving said piston portion in a manner rotatable about a longitudinal axis thereof, and shiftable in a direction of said longitudinal axis to an extent limited by elastic means arranged between interior surfaces of said housing and exterior surfaces of said piston;
an annular-type force measuring means comprising a piston-type ring mounted on said piston portion said piston-type ring having a lower first ring surface at its one end, a second higher ring surface at its other end, and an essentially radial surface connecting said two ring surfaces, and an annular member surrounding said piston-type ring and having an interior peripheral contour complementary to that of said piston-type ring for forming narrow cylindrical gaps with said lower ring surface and said upper ring surface and a space with said essentially radial surface, said gaps and said space being filled with elastomeric material fixedly adhering to surfaces contacted thereby, a pressure sensor being mounted in said annular member in contact with said elastomeric material, said annular member being fixed to an interior peripheral surface of said housing such that forces acting in a direction of said longitudinal axis of said piston portion are determined by said force measuring cell.

6. The trailer coupling of claim 5, wherein said piston-type ring of said force measuring means is movably fitted on said piston portion engaging said elastic means bearing against a stop surface provided at said piston portion.

7. The trailer coupling of claim 5, wherein said end wall of said housing has formed thereon an inward piston-type projection coaxial with said piston portion of said connecting means said projection being inserted in a pot-type member forming a narrow cylindrical gap between an interior peripheral surface of said member and an exterior peripheral surface of said projection and a space between a bottom surface of said member and an inner end surface of said projection said gap and said space being filled with elastomeric material, a pressure sensor being mounted in said end wall arranged in contact with said elastomeric material, further elastic means being arranged between end surfaces of said pot-type member and said piston portion.

8. A trailer coupling for connecting a trailing vehicle to a tracting vehicle comprising:
standard-type connecting means for connecting said trailing vehicle to said tracting vehicle and having a rear end thereof formed as a piston portion;
an essentially cylindrical housing fixed at said tracting vehicle for receiving said piston portion in a manner rotatable about a longitudinal axis thereof, and shiftable in a direction of said longitudinal axis to an extent limited by elastic means arranged between interior surfaces of said housing and exterior surfaces of said piston;
a force measuring means comprised by said end wall of said housing having formed thereon an inward piston-type projection coaxial with said piston portion of said connecting means said projection being inserted in a pot-type member forming a narrow cylindrical gap between an interior peripheral surface of said member and an exterior peripheral surface of said projection and a space between a bottom surface of said member and an inner end surface of said projection said gap and said space being filled with elastomeric material, a pressure sensor being mounted in said end wall arranged in contact with said elastomeric material, said elastic means further being arranged between end surfaces of said pot-type member and said piston-type projection.

9. The trailer coupling of claim 5, further comprising spring means arranged between radial surfaces of said piston-type ring of said force measuring means and said piston for biasing said force measuring means.

10. The trailer coupling of claim 7, further comprising spring means arranged between radial surfaces of said piston-type ring of said force measuring means and said piston for biasing said force measuring means.

11. The trailer coupling of claim 5, wherein said pressure sensor is arranged in recess of said piston-type projection.

12. The trailer coupling of claim 6, wherein said pressure sensor is arranged in recess of said piston-type projection.

13. Trailer coupling for a fifth wheel connection comprising:
a saddle plate provided with a draw eyelet and pivotally supported by means of a lateral shaft on two lateral support elements;
at least one of said support elements having integrated therein force measuring means for measuring forces in at least one of vertical, horizontally longitudinal and horizontally lateral directions.

14. The trailer coupling of claim 13, wherein said force measuring means comprise one vertically acting force measuring cell and at least one horizontally acting force measuring cell having central axes intersecting with each other.

15. The trailer coupling of claim 13, wherein said force measuring means is formed by force measuring cells of the type having a cylindrical recess formed in a unitary member, a piston having said vertical or horizontal, respectively, forces acting thereon being inserted into said recess forming a narrow cylindrical gap between the peripheral surface of said piston and a peripheral surface of said recess, elastomeric material essentially filling the narrow gap, and a space formed between a bottom surface of said recess and an interior end surface of said piston, a pressure sensor being arranged in contact with said elastomeric material, said unitary member being housed in a base part of said lateral support element.

16. The trailer coupling of claim 15, wherein said force measuring means for measuring longitudinal horizontal forces is formed as a twin measuring means designed symmetrically in opposite manner with said pistons being formed at opposite sides of said unitary member complementary recesses being formed in said base part of said support element such that both pulling and pushing forces may be measured by the associated of said force measuring cells.

17. The trailer coupling of claim 16, wherein said force measuring cell measuring vertical forces is formed in said unitary member as well.

18. The trailer coupling of claim 16, wherein said unitary member is of cross-type form having said pistons formed at each end thereof with said base part having formed therein recesses complementary thereto.

19. The trailer coupling of claim 13, wherein said force measuring means for measuring lateral horizontal forces is integrated in the connection of said lateral shaft to at least one of said lateral support elements 20. The trailer coupling of claim 13, further comprising spring means for biasing said force measuring means in a direction opposite to a resulting force application.

21. A force measuring device which may be integrated into an elastic joint connection between a rigid piston-type inner member and a rigid cylindrical exterior member having an interior shape complementary to peripheral surfaces of said inner member comprising:

upper and lower narrow annular gap portions between opposing surfaces of said inner and exterior members and having different ring diameters;

elastomeric material filling said upper and lower gap portions and strongly adhering to surfaces in contact therewith;

a transition step between said upper and lower annular gap portions, forming a ring space circumferentially filled with said elastomeric material;

pressure sensor means arranged in pressure transmitting engagement with said elastomeric material; and biasing means for preventing an axial separation between said exterior and inner members.

* * * * *